(12) United States Patent
Guha et al.

(10) Patent No.: US 8,171,021 B2
(45) Date of Patent: May 1, 2012

(54) QUERY IDENTIFICATION AND ASSOCIATION

(75) Inventors: Ramananthan V. Guha, Los Altos, CA (US); Shivakumar Venkataraman, Santa Clara, CA (US); Vineet Gupta, Bangalore (IN); Gokay Baris Gultekin, San Francisco, CA (US); Pradnya Karbhari, Bangalore (IN); Abhinav Jalan, Pradesh (IN)

(73) Assignee: Google Inc., Mountain View, CA (US)

( * ) Notice: Subject to any disclaimer, the term of this patent is extended or adjusted under 35 U.S.C. 154(b) by 374 days.

(21) Appl. No.: 12/486,195

(22) Filed: Jun. 17, 2009

(65) Prior Publication Data

US 2009/0319517 A1    Dec. 24, 2009

Related U.S. Application Data

(60) Provisional application No. 61/074,945, filed on Jun. 23, 2008.

(51) Int. Cl.
 *G06F 7/00* (2006.01)
 *G06F 17/30* (2006.01)
(52) U.S. Cl. ...................... 707/723; 707/748
(58) Field of Classification Search .................. None
 See application file for complete search history.

(56) References Cited

U.S. PATENT DOCUMENTS

| | | | |
|---|---|---|---|
| 7,577,643 B2 * | 8/2009 | Dominowska et al. | 1/1 |
| 7,689,554 B2 * | 3/2010 | Jones et al. | 707/999.004 |
| 7,739,264 B2 * | 6/2010 | Jones et al. | 707/713 |
| 7,818,315 B2 * | 10/2010 | Cucerzan et al. | 707/723 |
| 7,827,172 B2 * | 11/2010 | Zaragoza | 707/723 |
| 7,962,479 B2 * | 6/2011 | Jones et al. | 707/728 |
| 2004/0215606 A1 | 10/2004 | Cossock | |
| 2004/0249808 A1 * | 12/2004 | Azzam et al. | 707/4 |
| 2005/0033771 A1 | 2/2005 | Schmitter et al. | |
| 2005/0234953 A1 | 10/2005 | Zhang et al. | |
| 2007/0214131 A1 * | 9/2007 | Cucerzan et al. | 707/5 |
| 2009/0192983 A1 * | 7/2009 | Elango | 707/3 |
| 2009/0319517 A1 * | 12/2009 | Guha et al. | 707/5 |

OTHER PUBLICATIONS

Transmittal of the International Search Report and the Written Opinion of the Internal Searching Authority, or the Declaration, Jan. 27, 2010, 12 pages.

* cited by examiner

*Primary Examiner* — Kuen Lu
*Assistant Examiner* — Tuan A Pham
(74) *Attorney, Agent, or Firm* — Fish & Richardson P.C.

(57) ABSTRACT

Apparatus, systems and methods for predictive query identification for advertisements are disclosed. Candidate query are identified from queries stored in a query log. Relevancy scores for a plurality of web documents are generated, each relevancy score associated with a corresponding web document and being a measure of the relevance of the candidate query to the web document. A web document having an associated relevancy score that exceeds a relevancy threshold is selected. The selected web document is associated with the candidate query.

17 Claims, 10 Drawing Sheets

QUERY IDENTIFICATION AND ASSOCIATION

CROSS-REFERENCE TO RELATED APPLICATION

This application claims the benefit under 35 U.S.C. §119(e) of U.S. Provisional Patent Application No. 61/074,945, entitled "QUERY IDENTIFICATION AND ASSOCIATION," filed Jun. 23, 2008, which is incorporated here by reference.

BACKGROUND

This document relates to information processing.

The Internet enables access to a wide variety of web documents, e.g., video and/or audio files, web pages for particular subjects, news articles, etc. Such access to these web documents has likewise enabled opportunities for targeted advertising. For example, web documents of particular interest to a user can be identified by a search engine in response to a user query. The query can include one or more search terms, and the search engine can identify and, optionally, rank the web documents based on the search terms in the query and present the web documents to the user (e.g., according to the rank). This query can also be an indicator of the type of information of interest to the user. By comparing the user query to a list of queries and keywords specified by an advertiser, it is possible to provide targeted advertisements to the user. The targeted advertisements can include links to landing pages, and the selection of a link can cause the landing page to be displayed on a web browsing device.

Advertisers typically attempt to anticipate the specific queries submitted by users that may be related to the advertiser's product or service offered. The keywords specified by advertisers can include keywords related to the product or service offered by the advertiser. These keywords can be broadly matched to the product or service offered by the advertiser, e.g., the keyword "flower" may broadly match to "florist" in a web document. Such broad matching can, however, produce less than desirable results (e.g., fewer conversions). Additionally, an advertiser may not identify a particularly relevant keyword (referred to as a "missing keyword"). Thus, a query including a missing keyword may be deemed less relevant to the advertiser's content. Accordingly, specific queries for products may sometimes not result in the selection of advertisements linking to landing pages that are highly relevant to the query.

SUMMARY

In general, one aspect of the subject matter described in this specification can be embodied in methods that include the actions of identifying a candidate query from queries stored in a query log; generating relevancy scores for a plurality of web documents, each relevancy score associated with a corresponding web document and being a measure of the relevance of the candidate query to the web document; selecting a web document having an associated relevancy score that exceeds a relevancy threshold; and associating the selected web document with the candidate query. Other embodiments of this aspect include corresponding systems, apparatus, and computer program products.

Another aspect of the subject matter described in this specification can be embodied in methods that include the actions of defining query extraction criteria, the query extraction criteria configured to identify queries related to a subject relevance; identifying a candidate query from the queries stored in a query log according to the extraction criteria; generating relevancy scores for a first set of web documents, each relevancy score associated with a corresponding web document in the first set of web documents and being a measure of the relevance of the candidate query to the web document; selecting web documents having an associated relevancy score that exceeds a relevancy threshold; and generating a query-page candidate tuple from the selected web documents and the candidate query. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
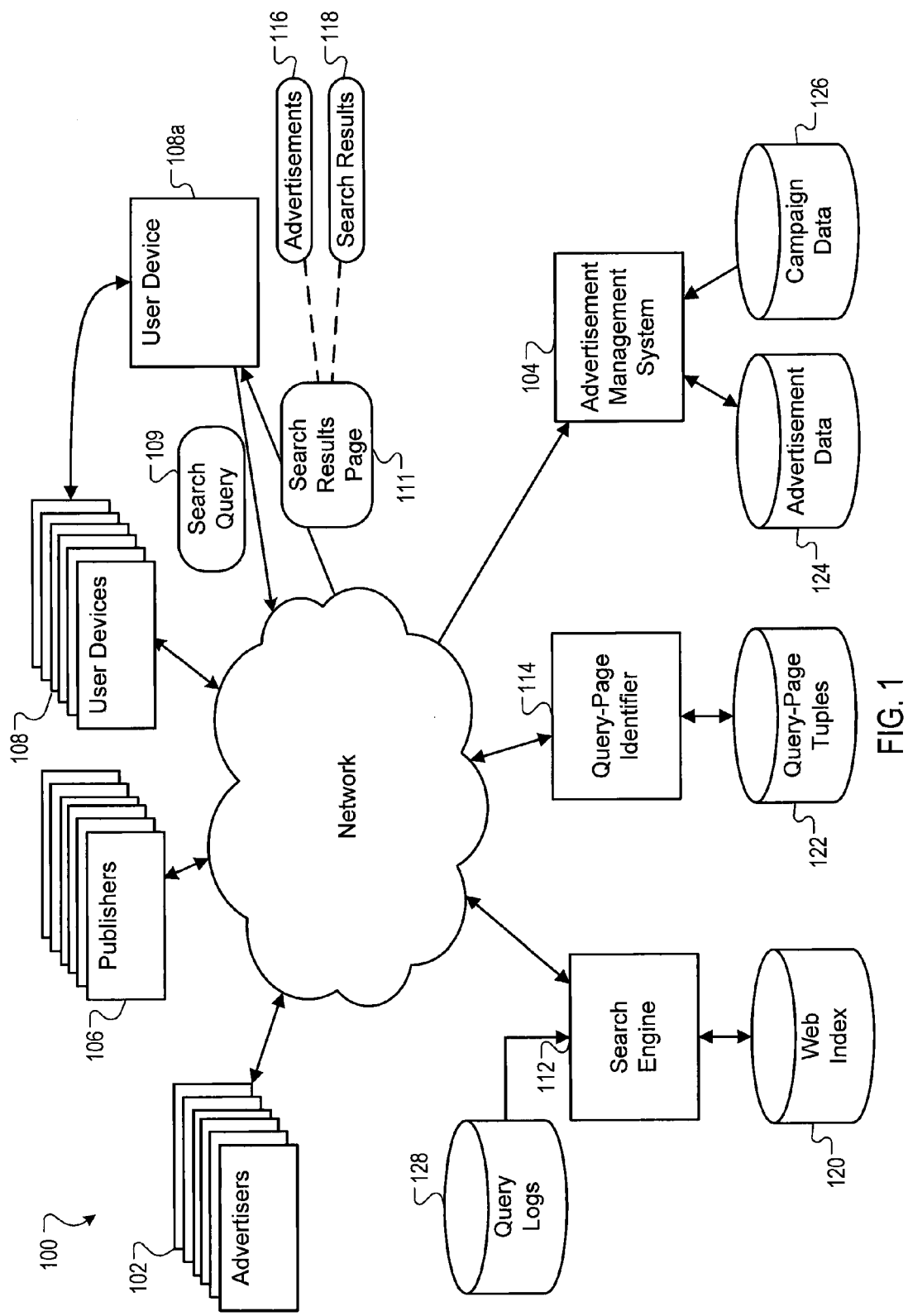
FIG. 1 is a block diagram of an example online environment.

FIG. 1 is a block diagram of an example online environment 100. The online environment 100 can facilitate the identification and serving of web documents, e.g., web pages, advertisements, etc., to users. A computer network 110, such as a local area network (LAN), wide area network (WAN), the Internet, or a combination thereof, connects advertisers 102, a search engine 112, publishers 106, and user devices 108. Example user devices 108 include personal computers, mobile communication devices, television set-top boxes, etc. The online environment 100 may include many thousands of advertisers, publishers and user devices.

§1.0 Search Processing

A user device, such as user device 108a, can submit a search query 109 to the search engine 112, and a search results page 111 can be provided to the user device 108a in response to the search query 109. The search results page 111 can include one or more links to web documents provided by the publishers 106.

In some implementations, the search query 109 can include one or more search terms. A search term can be of the form of one or more keywords submitted as part of a search query through a search engine 112 that is used to retrieve responsive search results. For example, a user of the user device 108a can search for an online store to purchase a star shaped cake pan. The search query 109 submitted can be for "star cake pan." The search terms in this example can be "star," "cake," and "pan."

The publishers 106 can include general content servers that receive a request in the form of the search query 109 for content (e.g., web documents related to articles, discussion threads, music, video, graphics, other web document listings, information feeds, product reviews, etc.), and retrieve links to content on the search results page 111 in response to the search query 109. For example, content servers related to news content providers, retailers, independent blogs, social network sites, products for sale, or any other entity that provides content over the network 110 can be a publisher.

To facilitate identification of the content responsive to queries, the search engine 112 can index the content provided by the publishers 106 and advertisers 102 (e.g., an index of cached web documents such as web index 120) for later search and retrieval of search results 118 that are relevant to the queries. An exemplary search engine 112 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can be identified and ranked by various relevancy scores, e.g., information retrieval ("IR") scores based on text of cached and indexed web documents, feature vectors of identified documents, and other search processing techniques. In some implementations, IR scores can be computed from, for example, dot products of feature vectors corresponding to a query and a document, page rank scores, and/or combinations of IR scores and page rank scores, and so on.

The search results 118 can include, for example, lists of web document titles, snippets of text extracted from those web documents and hypertext links to those web documents, and may be grouped into a predetermined number (e.g., ten) of search results. Search results 118 can also be ranked by the search engine 112, and presented as content on the search results page 111.

The search terms in the search query 109 control the search results 118 that are provided by the search engine 112 through the search results page 111. Although the actual ranking of the search results 118 vary based on the ranking algorithm used by the search engine 112, the search engine 112 can retrieve and rank search results 118 based on the search terms submitted through a search query 109. For example, a search query for "star cake pan" can produce search results that are related to online retailers of cake pans, based on the search terms "star," "cake," and "pan."

§2.0 Sponsored Content

In some implementations, the search results page 111 can include advertisements 116, or can include executable instructions, e.g., JavaScript™ instructions, that can be executed at the user device 108a to request advertisements 116 over the network. The advertisements 116 can be in the form of graphical advertisements, such as banner advertisements, text only advertisements, image advertisements, audio advertisements, video advertisements, advertisements combining one of more of any of such components, etc., or any other type of electronic advertisement document. The advertisements 116 also include embedded information, such as a links to landing pages.

Any web document can be a landing page; a landing page is any web document that is, or can be, linked to from another web document, advertisement, or search result. For example, the landing page can be a web document that describes and/or offers for sale the advertiser's product or service. The landing page can, for example, also be a homepage for the advertiser, e.g., a company's home page.

The advertisements 116 can be selected by the advertising management system 104 based on the keywords of the search query submitted to the search engine 112. In some implementations, the advertisers 116 are associated with keywords, and when particular keywords are identified in search queries, the advertisements 116 that are associated with those keywords can be selected for display on the search results page 111.

In addition to the advertisements being selected based on the search query, the advertisements can also be selected from an auction. In one implementation, advertisers 102 can select, or bid, an amount the advertisers are willing to pay for each interaction with an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. The rank of an advertisement that is displayed can be determined by multiplying the maximum cost-per-click for the advertisement by a quality score of the advertisement, the latter of which can be determined, in part, by the advertisement's relevance to the keywords of the query. The advertisement can then be placed among other advertisements in order of increasing or decreasing rank.

The advertisement management system 104 can store the advertisement information in the advertisement data 124. The advertisement management system 104 can also store information related to advertising campaigns in the campaign data 126. The campaign data 126 can, for example, specify advertising budgets for advertisements, associate keywords with advertisements and landing pages, and specify when, where and under what conditions particular advertisements may be served for presentation.

The advertisers 102, publisher 106, user devices 108, and/or the search engine 112 can also provide usage information to the advertisement management system 104. This usage information can include measured or observed user behavior related to advertisements 116 that have been served, such as, for example, whether or not a conversion or a selection related to an advertisement 116 has occurred. The advertisement management system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a web document returned by the publisher or the advertising management system. The CTR is a performance metric that is obtained by, for example, dividing the number of users that clicked on the web document, e.g., a link to a landing page, an advertisement 116, or a search result 118, by the number of times the web document was delivered. A "conversion" occurs when a user consummates a transaction related to a previously served advertisement 116. What constitutes a conversion may vary from case to case and can be determined in a variety of ways. For example, a conversion may occur when a user clicks on an advertisement 116, is referred to the advertiser's landing page, and consummates a purchase there before leaving that landing page. Other actions that constitute a conversion can also be used.

§3.0 Query Association with Advertisements

The keywords that the advertisers 102 associate with advertisements can be selected based on keywords that the users may use when searching for information related to the commercial offering being advertised. A commercial offering can be any opportunity on a landing page for a transaction, e.g., the sale of a product or service. Thus, by use of the advertising management system 104, the advertisers 102 are able to associate their advertisements 116 for the commercial offering with the keywords of the query. For example, a retailer of cake pans can anticipate that a user searching for cake pans will likely include the search terms "cake" and "pan" in their search query. Thus, the retailer of cake pans can associate its advertisement with the keywords "cake" and "pan." Searches that include the keywords cake and pan can result in the presentation of an advertisement provided by the retailer of cake pans.

However, the use of matching keywords, either exactly or broadly, may not always result in the identification of advertisements that link to landing pages that are relevant to the users' interests. Thus, an alternative is to process queries and associate the queries as a whole and, optionally, their individual keywords, with advertisements and/or landing page. The process, however, is quite difficult, as there are millions of search queries submitted by users and stored in query logs 128.

Thus, in some implementations, the advertising management system 104 can use a query-page identifier 114 that can identify stored queries from query logs 128 that are determined to be relevant to particular landing pages. The query-page identifier 114 first identifies candidate queries from the query logs 128, and then identifies landing pages related to the candidate queries by use of the search engine 112. In some implementations, the search engine 112 searches a proper subset of indexed web documents in the web index 120, the proper subset being commerce-related landing pages. For each query, the identified landing pages exceeding a relevancy threshold are associated with the candidate queries by the query-page identifier 114, which then stores these associations as query-page tuples 122.

By way of example, the query-page identifier 114 can determine that the query "train cake pan" may result in the identification of a particular landing page for Online Store A that offers a "train cake pan" product. The query-page identifier 114 will thus associate the landing page for the train cake pan of Online Store A with the candidate query "train cake pan." Thereafter, when a user submits the query "train cake pan," or, for example, any query that includes permutations of the terms train, cake and pan, the advertisement that links to the landing page can be identified and provided in the search results page 111.

Figure 2:
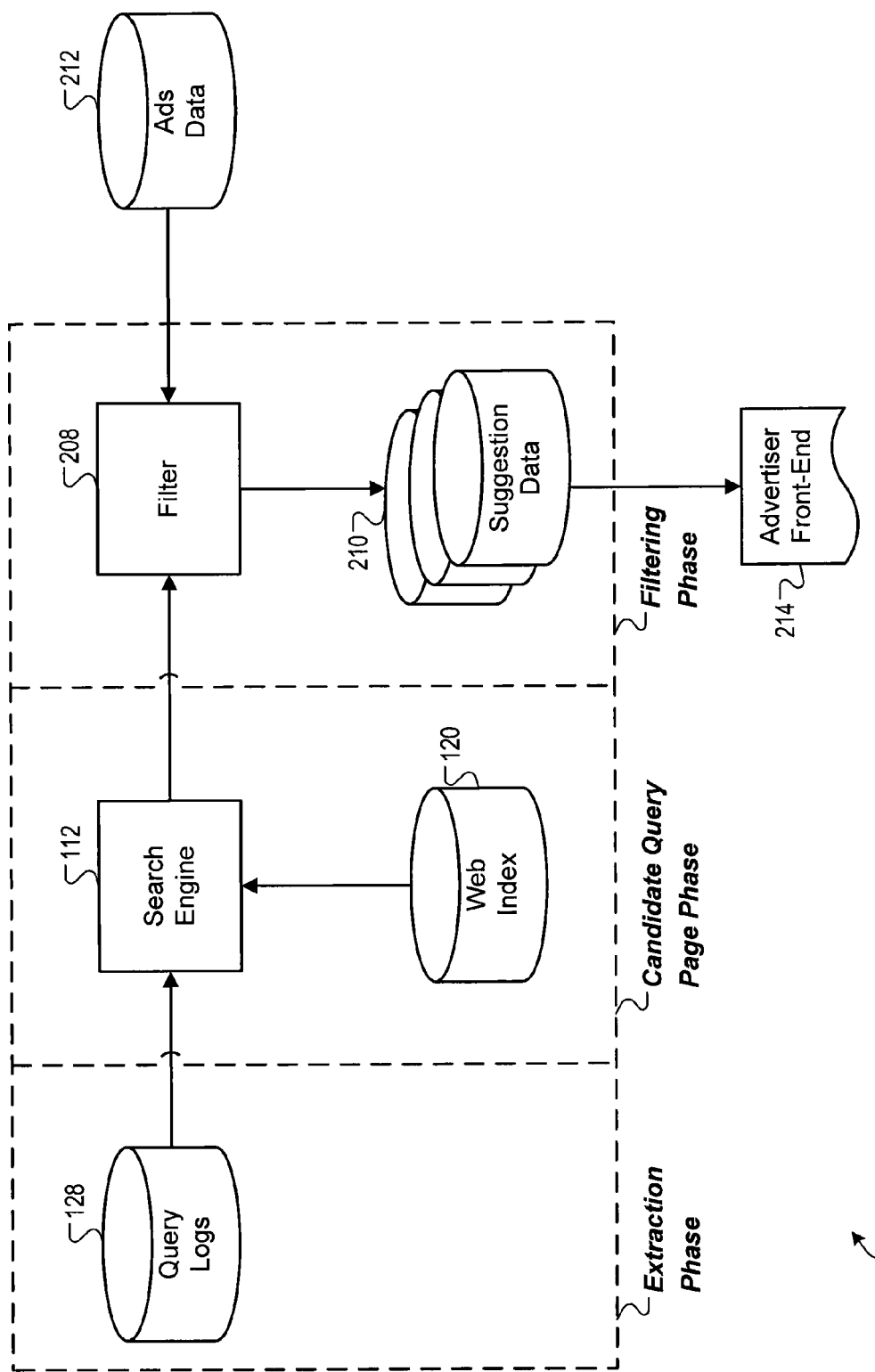
FIG. 2 is a block diagram illustrating an example operational process.

FIG. 2 is a block diagram 200 illustrating an example operational process. The three phases include an extraction phase, a candidate query-page phase, and a filtering phase. These phases are illustrative only and more or fewer phases can be used.

In the extraction phase, candidate queries are identified from the query log 128. In the candidate query-page phase, the search engine 112 can be used to search (e.g., a web index 120) for landing pages related to the candidate query and generate candidate query-page tuples. In the filtering phase, the identified candidate query-page tuples can be filtered (e.g., by a filter 208) based on the various relevancy criteria. The candidate query-page tuples that are not eliminated by the filter 208 can be associated with an advertisement in advertisement data 212, or stored in suggestion data 210 that defines suggestions for association with an advertisement, or used in some other data analysis or other process.

In some implementations, to identify a candidate query, the query-page identifier 114 identifies queries from the query log 128 that meet one or more extraction criterion. In some implementations, the extraction criteria are used to identify queries that are commerce related, e.g., commercially relevant queries. In some implementations, the query-page identifier 114 does not consider a query to be commercially relevant unless it was submitted at least a minimum number of times during a time period, and less than a maximum number of times during the time period. Other methods of determining whether a query is commercially relevant can also be used. These commercially relevant queries are identified as candidate queries.

For example, the query-page identifier 114 can identify that the query log 128 includes a query for "train cake pan." The query for "train cake pan" can be considered commercially relevant if it was submitted in excess of a minimum frequency of submission threshold, and if it was not submitted in excess of the maximum frequency of submission threshold.

During the candidate query-page phase in the example above, the web index 120 is searched using the identified candidate queries. In some implementations, a proper subset of the web index 120 that includes on a set of landing pages that contain commercial offerings is searched using the candidate queries. For example, a proper subset of the web index 120 can include a subset of landing pages that list products or services for sale. For example, five different online stores that sell cake pans and all have landing pages can be a part of the proper subset of the web index 120; conversely, a governmental site may have web documents included in the web index, but the web documents from the governmental site may not be considered part of the proper subset of the web index.

The query-page identifier 114 can use the search engine 112 to search the proper subset of web index 120 to find landing pages related to each candidate query. In some implementations, for each candidate query, the search engine 112 can assign a relevancy score to each web document in the proper subset that measures the relevance of the candidate query to that web document. For example, two of the five online stores, Online Store A and Online Store B, sell train cake pans and each have a landing page directed to train cake pans, whereas the other three online stores only sell more traditional cake pans. Thus, the landing pages that include the "train cake pan" for Online Store A and Online Store B will have higher relevancy scores than the landing page for the other three online stores for the query "train cake pan."

The query-page identifier 114 can select candidate landing pages from the set of identified landing pages based on the relevancy score of the landing page. In some implementations, the search engine 112 selects only the landing pages assigned a relevancy score that exceeds a relevancy threshold. For example, the search engine 112 can select the landing pages for Online Store A and Online Store B for association with the candidate query "train cake pan" if each of those stores has a relevancy score above a relevancy threshold. The landing pages for the other three stores may not be selected if their relevancy scores are below the relevancy threshold. The selected landing pages are paired with the candidate query and in some implementations are stored in query-page candidate tuples.

During the filtering phase, the candidates (e.g., query-page candidate tuples) are filtered (e.g., to create query-page tuples). The query-page tuples represent the subset of the query-page candidate tuples that meet one or more filtering criteria. In some implementations, a filter 208 can remove query-page candidate tuples if the tuple is not relevant to the commercial offering, e.g., queries that result in the identification of pages from the entire web index 120 that do not have a discernable intent, as measured by one or more statistical processes, and/or query-page candidate tuples for which the intent measure diverges from the intent measure of the identified landing pages from the entire web index. In some implementations, a suggestion vector and/or a query intent vector can be used to determine whether the candidate tuple is relevant to the commercial offering.

Subsequent to the filtering phase, filtered selections (e.g., the query-page tuples) can be associated with an advertisement. A query-page tuple can be associated with an advertisement by associating the query with the advertisement, and linking the advertisement to the landing page of the tuple. These associations can be stored in ad groups 212, which in some implementations are a collection of associations of keywords, advertisements and landing pages. For example, the candidate query of "train cake pan" can be associated with an advertisement that links to the landing page that offers train cake pans for the Online Store A.

In some implementations, the association between the tuple and advertisement is not automatic, and stored as suggestion data 210. The suggestion data 210 can be presented to advertisers through, for example, an advertiser front end 214, e.g., a client interface for an advertiser 102 into the advertising management system 104. Advertisers can use the advertiser front end 214 to accept a suggested association of the query-page tuples with the suggested advertisement.

§3.1 Identification of Candidate Queries

Figure 3:
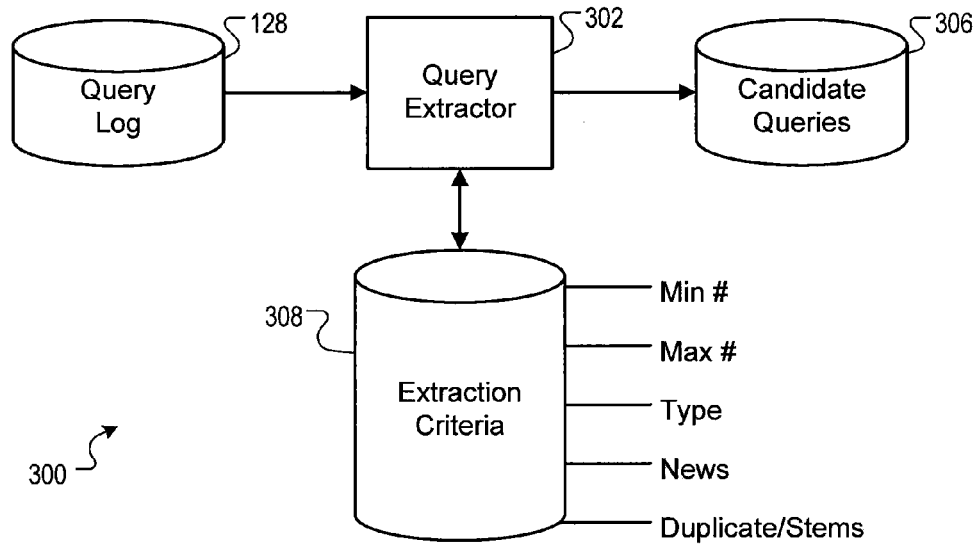
FIG. 3 is a block diagram showing an example extraction process.

FIG. 3 is a block diagram 300 showing an example extraction process (e.g., associated with query-page identifier 114). A query extractor 302 identifies from the query log 128 a set of candidate queries that meet one or more extraction criteria 308. The extraction criteria 308 can include criteria regarding the frequency of submission of the query, the timing of the query, the type of the query, and other criteria.

In some implementations, the frequency specified by the submission criterion can be selected to identify queries that occur at least a minimum number of times and occur less than a maximum number of times. The lower threshold can be selected to protect user privacy and to identify queries that are likely to again be submitted in the future. For example, a query that is submitted less than 50 times per year may not be commercially relevant; instead, it may be a focused query submitted by one user. Similarly, the upper threshold can be selected to filter out queries that are submitted frequently, as these queries tend to be either generic queries (e.g., "credit cards") or queries that are of topical or pop-culture interests (e.g., a famous person's name).

The query extractor 302 may also use timing criteria to analyze the timing of the query to determine if the query is commercially relevant. A query may not have the same level of commercial relevancy at different times. For example, a query for "pirate eye patch" may be commercially relevant during Halloween because people are more likely to search for costumes during Halloween. That same query may not be commercially relevant during non-Halloween time periods.

The query extractor 302 may also use type criteria to analyze the type of the query to determine if the query is commercially relevant. In some implementations, a query is not commercially relevant if it is not directed towards a commercial offering. Thus, the extraction criteria 308 can be used to eliminate queries that are educational, news related, or otherwise not directed towards a commercial offering. For example, the extraction criteria 308 can identify educational websites, news sites, current events and query phrases (such as "how to . . ." queries, "history of . . ." queries, etc.) as types of queries that are not directed to commercial offerings.

Other extraction criteria 308 can also be used to identify candidate queries. In some implementations, a query is not commercially relevant if there are already advertisements associated with the query. The query may also not be commercially relevant if the query has a low click-through rate; or is an expansion of a stem query that has already been selected according to the extraction criteria 308, and so on.

By way of example, in the process of identifying candidate queries, the query extractor 302 may encounter a series of unrelated queries as shown in table 1 that are possible candidate queries.

TABLE 1

| Possible Candidate Queries | |
| --- | --- |
| Query | # of submissions |
| Mr. Celebrity | 1,000,000 |
| red box | 48,000 |
| train cake pans | 23,000 |
| Battle Tactics | 32,000 |

The extraction criteria 308 may specify a minimum number of submissions in a one-month period of 50, and a maximum number of submissions during that same one-month period of 50,000. The first query, "Mr. Celebrity," is a very common query that was submitted more than the requisite minimum number of times. However, the frequency of submission on the first query also exceeded a maximum number of submissions. Thus, the query extractor 302 does not identify "Mr. Celebrity" as a candidate query.

The other three queries, "red box," "train cake pans," and "Battle Tactics," are queries that are submitted within the range of frequency of submission. Thus, each of these is identified as a candidate query.

Figure 4:
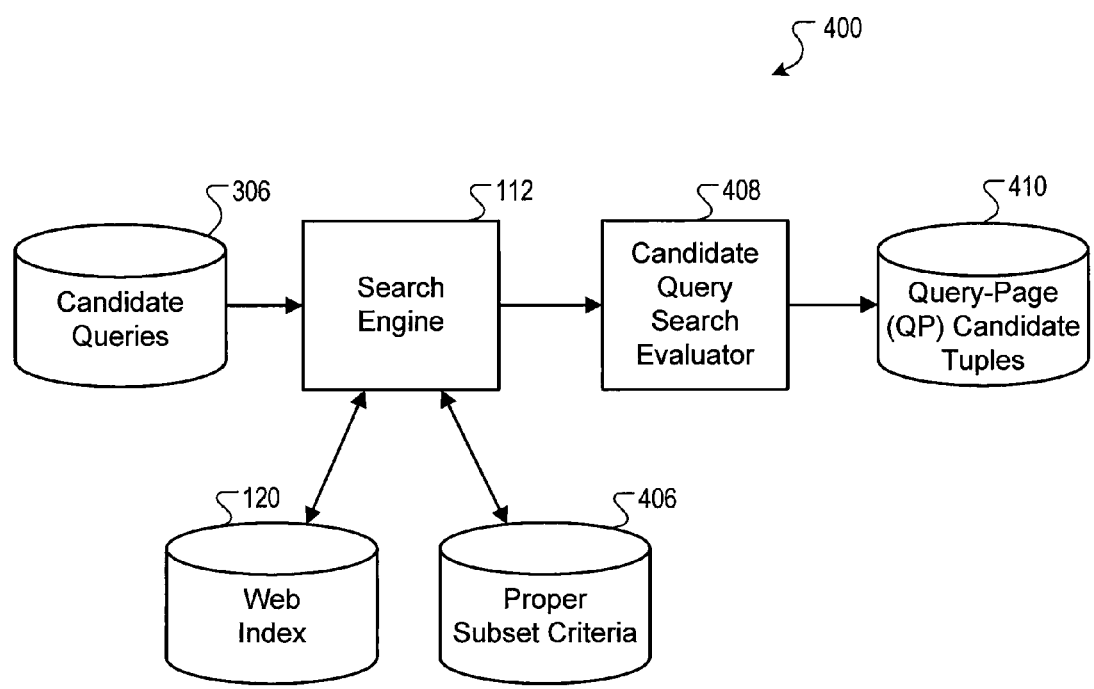
FIG. 4 is a block diagram of an example candidate query-page process.

§3.2 Identification of Candidate Query Landing Pages and Query-Page Candidate Tuples FIG. 4 is a block diagram 400 of an example candidate query-page process (e.g., associated with query-page identifier 114). In some implementations, a candidate query search evaluator 408 can use the search engine 112 and proper subset criteria 406 and the candidate queries to identify landing pages relevant to the candidate queries 306. The landing pages are used by the candidate query search evaluator 408 to identify query-page candidate tuples 410.

To identify the landing pages related to the candidate queries, the search engine 112 can search a proper subset of the web index 120 using the candidate queries 306. The query page identifier 114 can use the proper subset criteria 406 to identify the proper subset. In some implementations, proper subset criteria 406 identifies only pages from the web index 120 that include or are likely to include commercial offerings.

In some implementations, the proper subset criteria 406 identifies web pages with commercial offerings by identifying the type of the web page. Pages such as news pages, blogs, forums, and the like are not included in the proper subset, while pages related to companies or retailer are included in the proper subset to be searched. These pages can be identified and differentiated by, for example, a list of domain names; top level domain extensions, such as .biz, .com, .org, .edu; or web sites.

In some implementations, the proper subset criteria 406 identifies data that can be indicative of commercial offerings. In some implementations, the proper subset criteria 406 can include common phrases of commercial intent, e.g. "purchase," "sale," "shopping cart," etc. Other criteria for determining whether a web page has a commercial offering can also be used, e.g., web pages that are linked to pages with commercial offerings can be considered as commercial offerings, and included in the proper subset. In some implementations, other considerations (i.e., other than commercial offering) can be used to evaluate the subset.

In some implementations, the proper subset criteria 406 identifies web pages of advertisers 102 that have requested web pages to be searched. For example, an advertiser can provide a site map of its domain for inclusion in the proper subset criteria 406.

The candidate query search evaluator 408 can cause the search engine 112 to search the proper subset of the web index 120 defined by the proper subset criteria 406 for landing pages related to the candidate queries 306. In some implementations, the search engine 112 can assign a relevancy score to each landing page returned from the proper subset of the web index 120 for each candidate query. For example, the candidate queries 306 can include the query "train cake pans." The search engine 112 can search the proper subset for landing pages responsive to the candidate query "train cake pans." All landing pages responsive to "train cake pans" can be assigned relevancy scores indicated in Table 2.

TABLE 2

Landing Pages Responsive to "Train Cake Pans"

| Landing Page | Relevancy Score |
| --- | --- |
| www.<Cake Pan Store A>.com | 98 |
| www.<Kitchen Products Store B Cake Pans>.com | 92 |
| www.<Baking Products Store C>.com | 87 |
| www.<General Products Store D>.com | 72 |
| www.<General Products Store E>.com | 63 |

The candidate query search evaluator 408 can select landing pages identified from the proper subset based on the relevancy scores of the landing pages. In some implementations, the candidate query search evaluator 408 selects only the landing pages having a relevancy score that exceeds a relevance threshold. For example, if the relevance threshold is 85, then for the candidate query "train cake pans," the listed landing pages of Stores A, B, and C, each of which are assigned a relevancy score over the relevancy threshold of 85, are sufficiently relevant that they are selected by the candidate query search evaluator 408.

These selected landing pages are then associated with the corresponding candidate query in a query-page candidate tuple 410. For example, based on the relevancy threshold of 85, Table 3 lists the query-page candidate tuples for the candidate query "train cake pans."

TABLE 3

Query-Page Candidate Tuples for "Train Cake Pans"

"train cake pans" & Cake Pan Store A
"train cake pans" & Kitchen Products Store B Cake Pans
"train cake pans" & Baking Products Store C Because the landing pages of Store D and Store E did not exceed the relevancy threshold of 85, the landing pages for those stores are not included in candidate tuples with the candidate query "train cake pans."

In some implementations, the search engine 112 can be configured to perform a modified search on the proper subset of the web index 120 when identifying query-page candidate tuples. For example, estimated performance of the query, such as a predicted click through rate, can be omitted in a ranking process, and the ranking can be solely dependent on how relevant the candidate query is to the content of the web document. Other search algorithm modifications can also be made, e.g., ignoring keyword bids; ignoring geographic factors; and so on.

§3.3 Filtering the Query-Page Candidate Tuples

Figure 5:
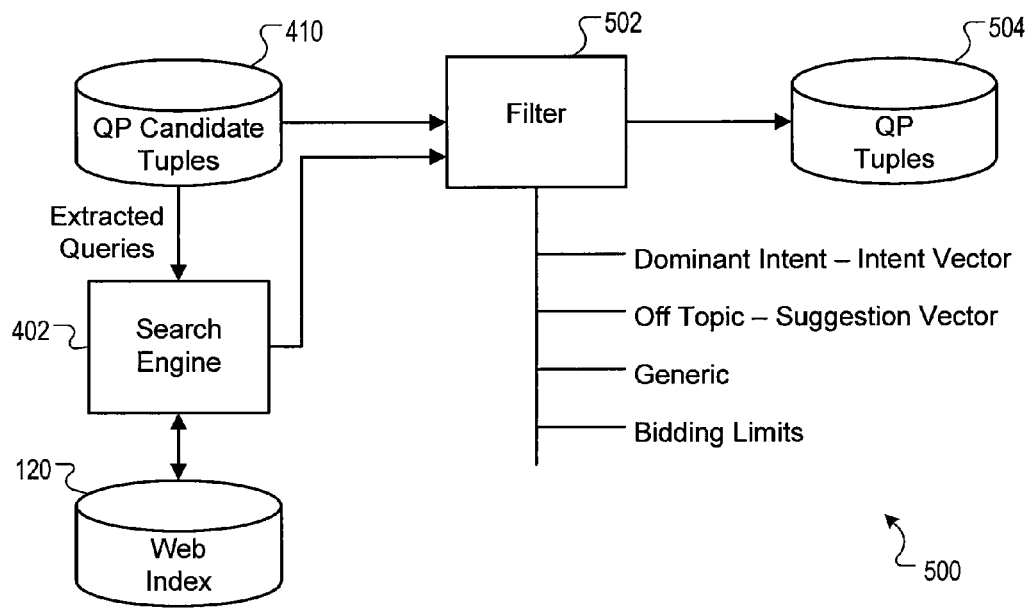
FIG. 5 is a block diagram of an example filtering process.

FIG. 5 is a block diagram of an example filtering process (e.g., associated with query-page identifier 114). In some implementations, a filter 502 can be used to select from the query-page candidate tuples 410 the query-page tuples that meet one or more filtering criteria. The filtering criteria can, for example, include dominant intent measures, query-page intent measures, generic query lists, and/or other criteria that are selected to eliminate query-page candidate tuples that would not result in commercially viable advertising suggestions.

In some implementations, the filter 502 can select from the candidate tuples 410 the tuples that likely present the better advertising opportunities to advertisers. In some implementations, a candidate tuple presents a likely advertising opportunity only where the dominant intent of the candidate query matches the intent of the selected landing pages of the candidate tuples 410. Thus, where there is no dominant intent of the candidate query, or where the dominant intent of the candidate query does not match the intent of the selected landing page, the candidate tuples 410 do not present a likely advertising opportunity.

§3.3.1 Dominant Intent Filtering

In some implementations, the dominant intent of the candidate query can be measured by use of an intent vector for the candidate query. The intent vector is a vector representation of the search results returned in response to using the candidate query to search the entire web index 120. In some implementations, the intent vector includes commonly associated terms from the identified landing pages, e.g., terms from the 10 highest ranked landing pages, for example.

In some implementations, the filter 502 can use the terms in the intent vector to calculate an intent measure. The intent measure identifies whether the candidate query has a dominant intent. In some implementations, candidate queries for which the landing pages produce an intent vector with a high intent measure have a dominant intent; conversely, candidate queries for which the landing pages produce an intent vector with a low intent measure have no dominant intent. The low intent measure indicates that the candidate query may be a generic query, or may be a query that is a poor expression of the users' interests.

For example, Table 4 identifies the terms commonly associated from landing pages identified by using the candidate query "train cake pan."

TABLE 4

| Intent Vector for "train cake pans" | |
| --- | --- |
| Candidate Query | Commonly Associated Terms |
| "train cake pans" | "train pan," "cake pans," "baking pans," "decorative cakes," "baking" |

The dominant intent of the candidate query "train cake pans" can be determined by analysis of Table 4. The candidate query "train cake pans" would have a high intent measure because all the terms commonly associated with the candidate query suggest that the dominant intent of the candidate query for "train cake pans" can be categorized as related to baking pans. Because the candidate query "train cake pans" has a high intent measure, it may present likely advertising opportunities.

Conversely, Table 5 identifies the terms commonly associated with the candidate query "red box."

TABLE 5

| Intent Vector for "red box" | |
| --- | --- |
| Candidate Query | Intent Vector Terms |
| "red box" | "multimedia," "programming languages," "knives," "bands," "books" |

The candidate query "red box" would not have a high intent measure because there is no dominant intent identified by the terms associated with the candidate query. The low intent measure of the candidate query "red box" indicates that "red box" is a generic term, and the commonly associated terms are not related to each other. Because there is not a dominant intent, the candidate query "red box" does not present likely advertising opportunities.

§3.3.2 Off-Topic Filtering

In some implementations, the filter 502 can also use a suggestion vector to determine whether the dominant intent of the candidate query matches the intent of the suggested landing pages, or if the candidate query is a query that results in the identification of landing pages from the entire web index 120 that are off topic from the landing pages in the query-page candidate tuples. In some implementations, a suggestion vector that is a vector representation of the landing pages that are part of the candidate tuples 410 can be used to measure the intent of the landing pages that are part of the candidate tuples 410. The suggestion vector can be compared to the intent vector that is based on the search results returned in response to using the candidate query to search the entire web index 120.

In some implementations, a suggestion vector for each of the landing pages is generated identifying words on the landing page, e.g., in the title of the landing page, the URL of the landing page, and phrases throughout the landing page. For example, Table 6 identifies the suggestion vectors for the landing pages paired with the query "train cake pans."

TABLE 6

| Suggestion Vector for Landing Pages Related to "Train Cake Pans" | |
| --- | --- |
| Landing Page | Suggestion Vector Terms |
| www.<Cake Pan Store A>.com | "train pan," "cake pan," "baking pans," "baking tools" |
| www.<Kitchen Products Store B Cake Pans>.com | "baking tools," "kitchen tools," "cake pans" |
| www.<Baking Products Store C>.com | "baking products," "cake pans," baking pans" |

In Table 6, representative words of each landing page are identified. The representative words of Cake Pan Store A indicate that the landing page is directed towards cake pans and baking supplies. Similarly, the representative words of the Store B and Store C landing pages indicate that each of the landing pages is directed towards baking products and kitchen supplies. Thus, the suggestion vector of each of the landing pages is directed toward baking products and kitchen tools.

In some implementations, an advertiser would not likely want to advertise on a landing page for a candidate query if the dominant intent of the candidate query is not the same as the intent for the landing page. Thus, in some implementations, the filter 502 compares the suggestion vector of the candidate query to the intent vector of the candidate query to generate a similarity measure. The similarity measure of the intent vector to the suggestion vector identifies the level of similarity of intent of the candidate query when used to search the entire index 120 to the intent when used to search the proper subset of the web index 120. Candidate tuples 410 with a similarity measure in excess of the similarity threshold are determined to be on-topic and are stored in the query-page tuples, while candidate tuples 410 that do not have a similarity measure in excess of the similarity threshold are determined to be off-top and are not stored in the query-page tuples 504. Other data structures can be used.

For example, the intent vector of the candidate query "train cake pans" identified baking pans as the dominant intent of the candidate query. Additionally, the suggestion vector of the landing pages from the candidate tuples 410 identify that the landing pages are directed to baking products. Thus, the "train cake pan" query-page candidate tuples 410 are stored as query page tuples 504.

In some implementations, candidate tuples 410 where the intent of the candidate query does not match the intent of the landing pages of the tuple are not stored as query page tuples 504. For example, table 7 identifies the terms commonly associated with the candidate query "Battle Tactics."

TABLE 7

| Intent Vector for "Battle Tactics" | |
| --- | --- |
| Candidate Query | Intent Vector Terms |
| "Battle Tactics" | "Military tactics," "military history," "Modern warfare" |

The dominant intent of the candidate query "Battle Tactics" can be determined by analysis of Table 7. All the terms commonly associated with the candidate query are related to the study of military tactics and warfare. Thus the candidate query "Battle Tactics" has a high intent measure related to the study of military tactics and warfare.

Table 8 identifies the terms commonly associated with landing pages that are also part of the "Battle Tactics" candidate tuples 410, i.e., pages that were identified by searching the proper subset of the web index 120 with the query "Battle Tactics."

TABLE 8

Suggestion Vector for Landing Pages Related to "Battle Tactics"

| Landing Page | Suggestion Vector Terms |
| --- | --- |
| www.<Game Store Y>.com | "Video games," "game controllers," "game cheats" |
| www.<Game Store Z>.com | "Video games," "tactics players," "game cheats" |

In contrast to the similarity of intent for the query "train cake pan" candidate tuples, the dominant intent of the candidate query "Battle Tactics" does not match the intent of the suggestion vector based on the "Battle Tactics" candidate query-page tuples. The suggestion intent vector of the candidate query "Battle Tactics" identifies video games as the dominant intent of the candidate query. Accordingly, when the query "Battle tactics" is submitted to the search engine, the identified web documents relating to military history may not be relevant to the video game. Thus, to preclude the serving of an advertisement that would be off-topic from the identified search results, the "Battle Tactics" candidate tuples 410 are not stored as query-page tuples 504.

§3.4 Associating the Query-Page Tuples with Advertisements

Figure 6A:
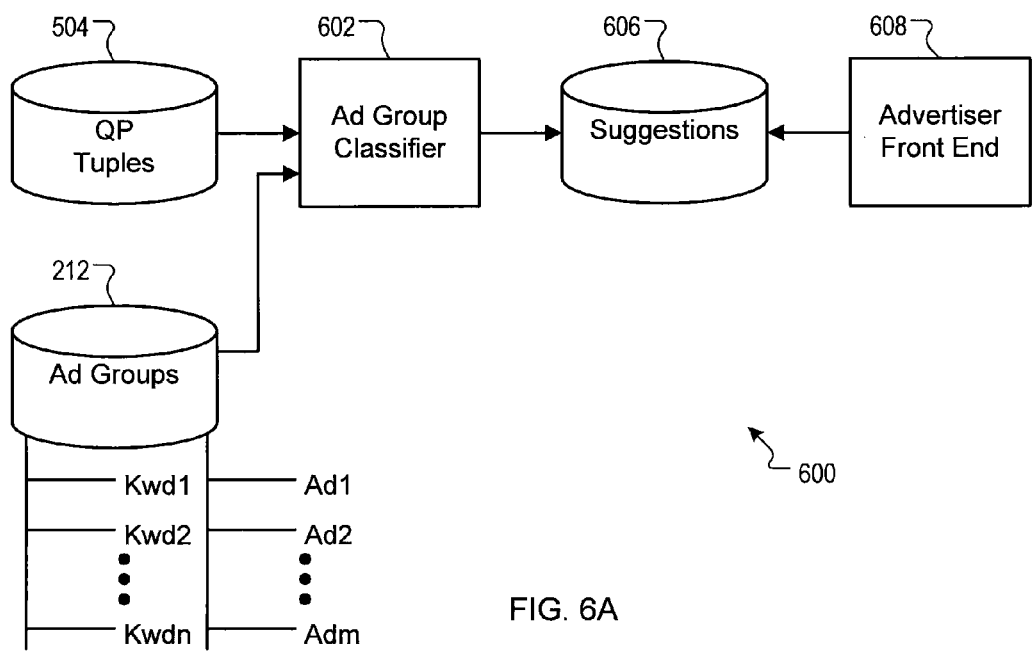
FIG. 6a is a block diagram illustrating an example association of query-page tuples with advertisements.

After query-page tuples 504 have been identified, the query-page tuples 504 can be associated with advertisements. FIG. 6a is a block diagram 600 illustrating an example association of query-page tuples 504 with advertisements stored in the ad groups 212. In some implementations, the ad groups 212 are a collection of associations of keywords, advertisements and landing pages, and can, for example, be used to implement and define an advertising campaign. Typically, the ad group 212 identifies the keywords that an advertiser is bidding on, and the advertisements associated with those keywords. If the advertiser wins an advertising slot in an auction, such as an auction conducted in response to receiving a query with one or more of the keywords in the ad groups 212, then the associated advertisement is displayed with the search results. In some implementations, the query-page identifier 114 can be used to augment the ad groups 212 to include queries and/or keywords and the associated landing pages in the ad groups 212.

In some implementations, the ad group classifier 602 compares the keywords from the candidate queries of the query-page tuples 504 to keywords associated with advertisements in ad groups 212. For example, the classifier 602 can compare the keywords of the candidate queries with keywords associated with existing advertisements. Synonyms of the keywords of the candidate queries can also be compared to synonyms of the keywords of associated with the advertisement. Other methods of comparing the candidate queries to the advertisements can also be used.

Based on this comparison, the ad group classifier 602 identifies suggested advertisement groupings that pair query-page tuples 504 with advertisements. The pairings of advertisements with query-page tuples 504 can be suggested for association as suggestions 606, or the pairings can be automatically associated with each other into ad groups 212. The suggestions 606 can be presented to the advertisers through the advertiser front end 608.

Figure 6B:
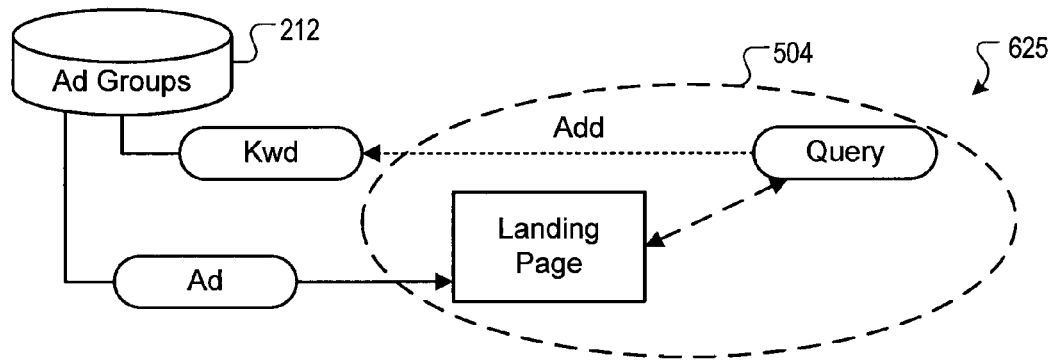
FIG. 6b is a block diagram illustrating an example association of query-page tuples with an existing advertisement.

FIG. 6b is a block diagram 625 illustrating an example association of query-page tuples 504 with an existing advertisement in an ad group 212. In this example, the ad group 212 includes an advertisement that includes a link to a landing page. The landing page has also been identified in a query-page tuple by the query page identifier 114. The ad group classifier 602 can associate the query that is associated with the landing page in the query-page tuple with the ad group 212 by adding the query to the ad group 212. In some implementations, the query is added as a keyword string, and the ad group 212 is configured to select the advertisement linked to the landing page when the query is received. Accordingly, the next time the query is submitted by a user, the advertising management system 104 will select the ad that includes the link to the landing page from the ad group for auction.

By way of example, the landing page for Cake Pan Store A is already associated with ad in the ad group 212. However, the query "train cake pans" is not advertised upon by Cake Pan Store A. The ad group classifier 602 thus associates the query "train cake pans" with the advertisement for the Cake Pan Store A landing page in the ad group 212.

Figure 6C:
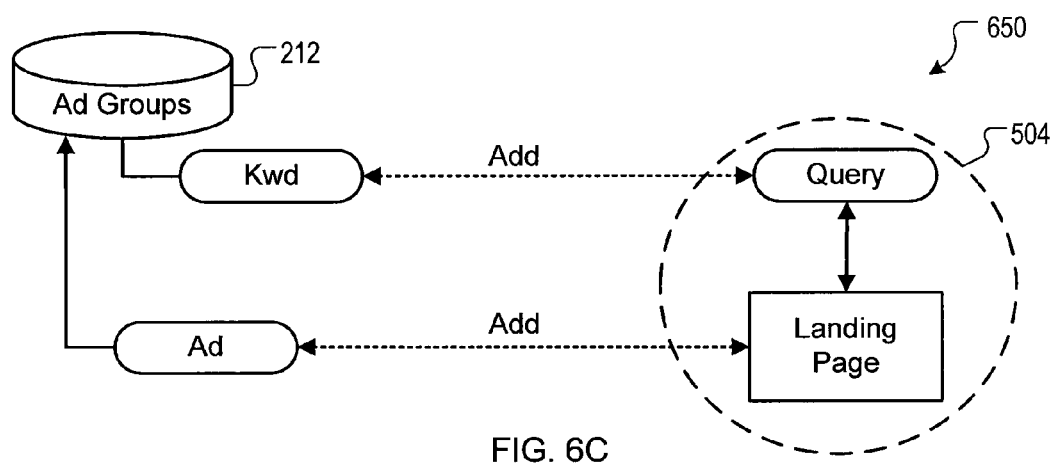
FIG. 6c is a block diagram illustrating another example association of query-page tuples with an advertisement.

FIG. 6c is a block diagram 650 illustrating an example association of query-page tuple 504 with an advertisement. In this example, a query from a query-page tuple has been identified as being relevant to the keywords of the ad group 212, e.g., the query may include a keyword that is in the ad group 212. Thus, the query can be included in the ad group 212, either automatically or in response to an advertiser accepting a suggestion to do so. Although the advertisement group 212 does not include an advertisement linked to the landing page associated with the query, the ad group classifier 602 can generate a new advertisement associating the candidate query of the query-page tuple with the landing page of the query-page tuple. The newly generated advertisement can be included in the ad group.

By way of example, the landing page for Kitchen Products Store B Cake Pans contains a commercial offering related to "train cake pans." Although the Kitchen Products Store B Cake Pans landing page is the landing page containing the commercial offering for "train cake pans," it is not associated with any advertisements or advertised on by keywords in the ad group 212. The ad group classifier 602 thus creates another advertisement that is linked to the Kitchen Products Store B Cake Pans landing page, and associates the candidate query, e.g., "train cake pan," with the advertisement for the landing page. Accordingly, the next time the query is submitted by a user, the advertising management system 104 will select the ad that includes the link to the landing page from the ad group for auction.

Figure 6D:
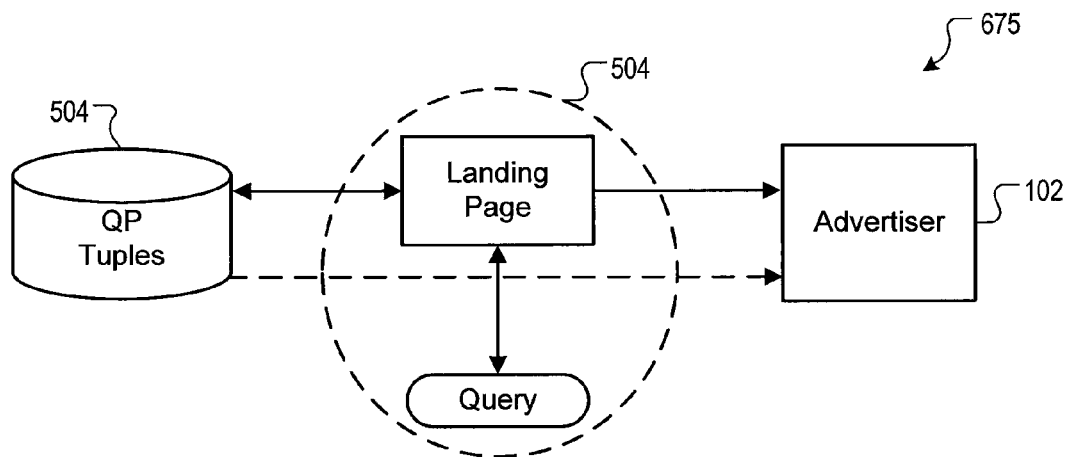
FIG. 6d is a block diagram illustrating another example association of a query-page tuple with an advertisement.

FIG. 6d is another block diagram 675 illustrating an example association of a query-page tuple with an advertisement. In this example, the advertiser may not have an existing advertising campaign, and thus there is no existing ad data 212 with which the query-page tuple can be associated.

FIGS. 6b and 6c illustrate two example processes by which a query-page tuple that includes a selected candidate query and associated web document are associated with the ad group 212. Other association processes can also be used.

In some implementations, the query-page tuple 504 can be used to suggest an advertisement for the advertiser 102. For example, by use of the advertising management system 104, the advertiser 102 may receive a notification of an advertising opportunity for one of its landing pages and one or more suggested queries as defined by the query-page tuple 504. If the advertiser 102 accepts the suggestion, then corresponding advertising data 212 can be created for the advertiser. For example, the advertiser 102 can provide a creative, bid information, and a budget to the advertising management system 104 to begin advertising offerings for the landing page indicated by the query-page tuple 504.

In some implementations, the ad group classifier 602 can process a site map of the website of the advertiser 102 and can suggest advertising data for interior nodes of the site map for which the children landing pages are included in the query-page tuples 504. For example, a retailer that sells clothing apparel may have a site map that includes a node "Shoes," which, in turn, includes child nodes "Women's Shoes" and "Men's Shoes." The retailer may offer, in corresponding web documents that are children of the "Women's Shoes" and "Men's Shoes" nodes, women's and men's shoes of a particular brand that are marketed by the shoe manufactures as being casual and comfortable shoes. The query-page identifier may identify query-page tuples 504 for each of these web documents and provide these suggestions to the retailer. Through use of the query-page tuples 504, the retailer can form an advertising campaign for the particular shoes.

§3.5 Other Uses for Query-Page Tuples

Figure 7:
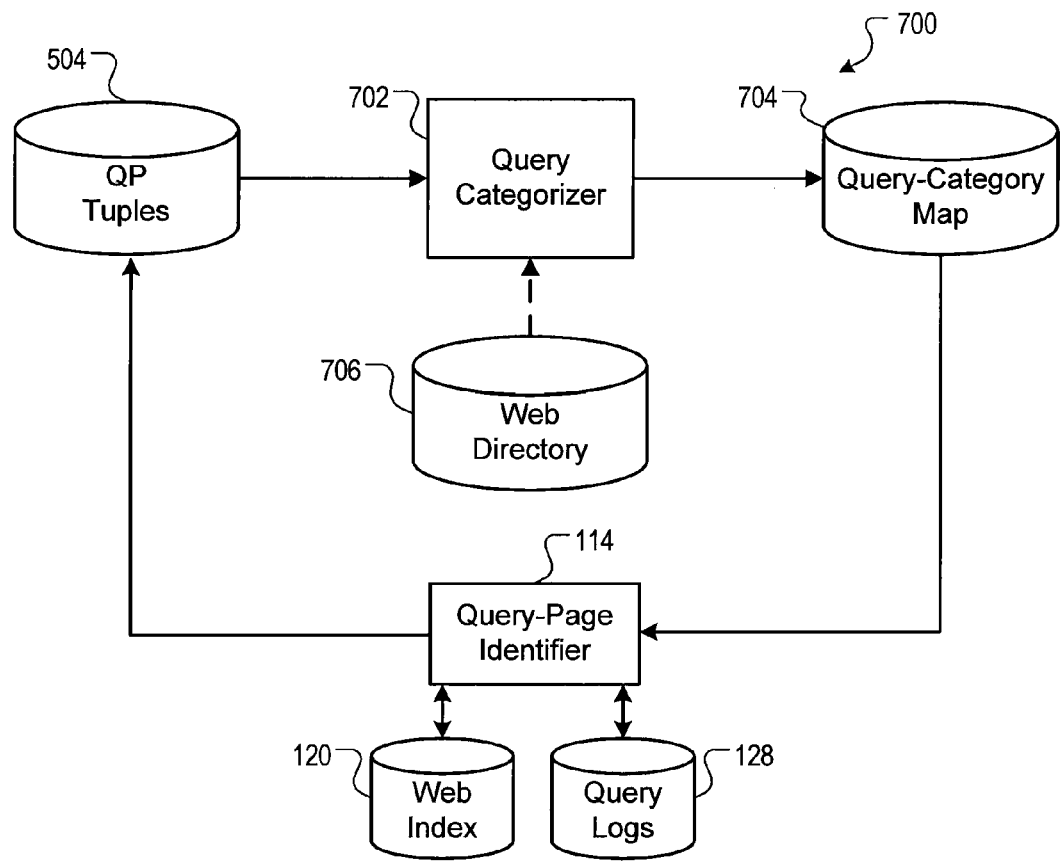
FIG. 7 is a block diagram illustrating an example association of query-page tuples with a query category.

The query-page tuples 504 have other uses in addition to facilitating targeted advertising. For example, the query-page tuples 504 can be used to generate a query-category map 704 that describes relevant user queries for certain categories. FIG. 7 is a block diagram 700 illustrating an example association of query-page tuples 504 with a query category. In one implementation, a query categorizer 702 can access the query-page tuples and a web directory 706 to generate the query-category map 704. The web director 706 can be a pre-existing directory of web documents classified according to hierarchal categories. Example web directories include the Open Directory Project, the Google Directory, or any other directory in which web documents are organized into categories.

The query categorizer 702 can identify a category in the category directory to which the selected web document of the query-page tuple belongs, and can associate the candidate query with the identified category so that the candidate query can be presented in response to a selection of the identified category.

In some implementations, query-page identifier 114 can use different extraction criteria, proper subset criteria, and filtering criteria for each category. For example, the extraction criteria and the filtering criteria described above can be used when processing the web index 120 and query logs 128 for web properties that include commercial offerings. Conversely, for web properties that are not related to the subject of commercial offerings, e.g., governmental sites, .edu and .org sites, etc., other extraction and filtering criteria can be used to identify relevant content for the other subject relevance. For example, queries and/or pages that include the phrase "research paper" can be included when identifying query-page tuples 504 for an educational subject relevance, and queries and/or pages that include the term "shopping cart" can be excluded for educational subject relevance. Likewise, the proper subset criteria can also be tailed to identify a subset of the web index 120 related to the subject relevance.

In some implementations, the proper subset criteria can define a proper subset of web properties based on the web properties included in each category, and the subsequent processing to identify query-page tuples 504 can be limited to pages in each category subset.

If the landing page of a query-page tuple is not present in the web director 706, in some implementations the query category 702 can identify a category to associate with the candidate query based on possible categorizations of the landing page. The query categorizer 702 can identify possible categorizations of the landing page based on the keywords in the landing page, for example.

Facilitating targeted advertising and query categorization are two examples of how query-page tuples 504 can be used. Using the processes described above, query-page tuples 504 can be created for any type of relevance factor, e.g., commercial, educational, religious, political, etc., and can be used to facilitate more effective and efficient distribution of relevant information. For example, queries related to tax filings and that are relevant to a governmental agency's tax-related web documents can be identified and these web documents can be boosted in the search results page for those queries.

§4.0 Example Process Flows

Figure 8:
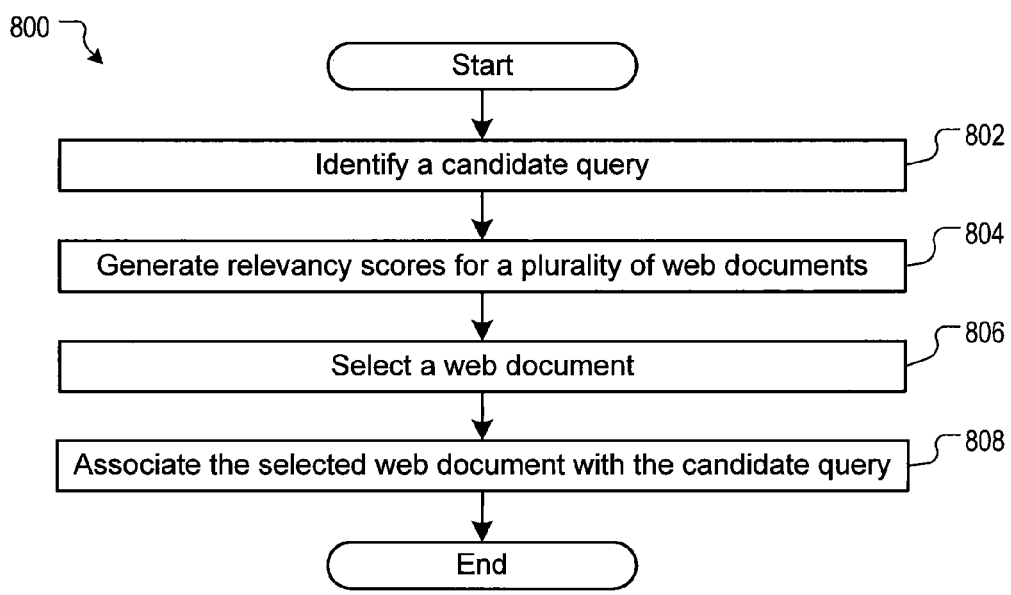
FIG. 8 is a flow diagram of an example process for identifying query-page candidate tuples.

FIG. 8 is a flow diagram of an example process 800 for identifying query-page candidate tuples. The process 800 can, for example, be implemented by the query-page identifier 114 of FIG. 1, and as described in FIGS. 2-4.

Stage 802 identifies a candidate query. Candidate queries can be identified from a query log by the query page identifier 114 or the query extractor 302. In some implementations, only queries that are commercially relevant are identified as candidate queries. Other criteria for selection, however, can also be used, such as queries that are educationally relevant, financially relevant, and so on.

Stage 804 generates relevancy scores for a plurality of web documents. The relevancy score measures the relevance of the candidate query to each of the plurality of web documents. For example, the query-page identifier 114 or the candidate query search evaluator 40 can cause the search engine 112 to search an index of web documents for web documents for each of the candidate queries identified in stage 802. Each of the web documents that are returned in response to the candidate query includes a relevancy score for the candidate query. The web documents that are searched can be a proper subset of web documents that are stored in a web index 120, and as defined by the proper subset criteria 406.

Stage 806 selects a web document. For example, the query-page identifier 114 or the candidate query search evaluator 408 can select a web document from the set web documents identified in stage 804 based on the relevancy score of the web document. In some implementations, only the web documents with relevancy scores exceeding a relevance threshold are selected by the query-page identifier 114.

Stage 808 associates the web document with the candidate query. For example, the query-page identifier 114 or the candidate query search evaluator 408 can associate the web document with the candidate query as a query-page candidate tuple 410 if the web document relevancy score exceeds the relevance threshold.

Figure 9:
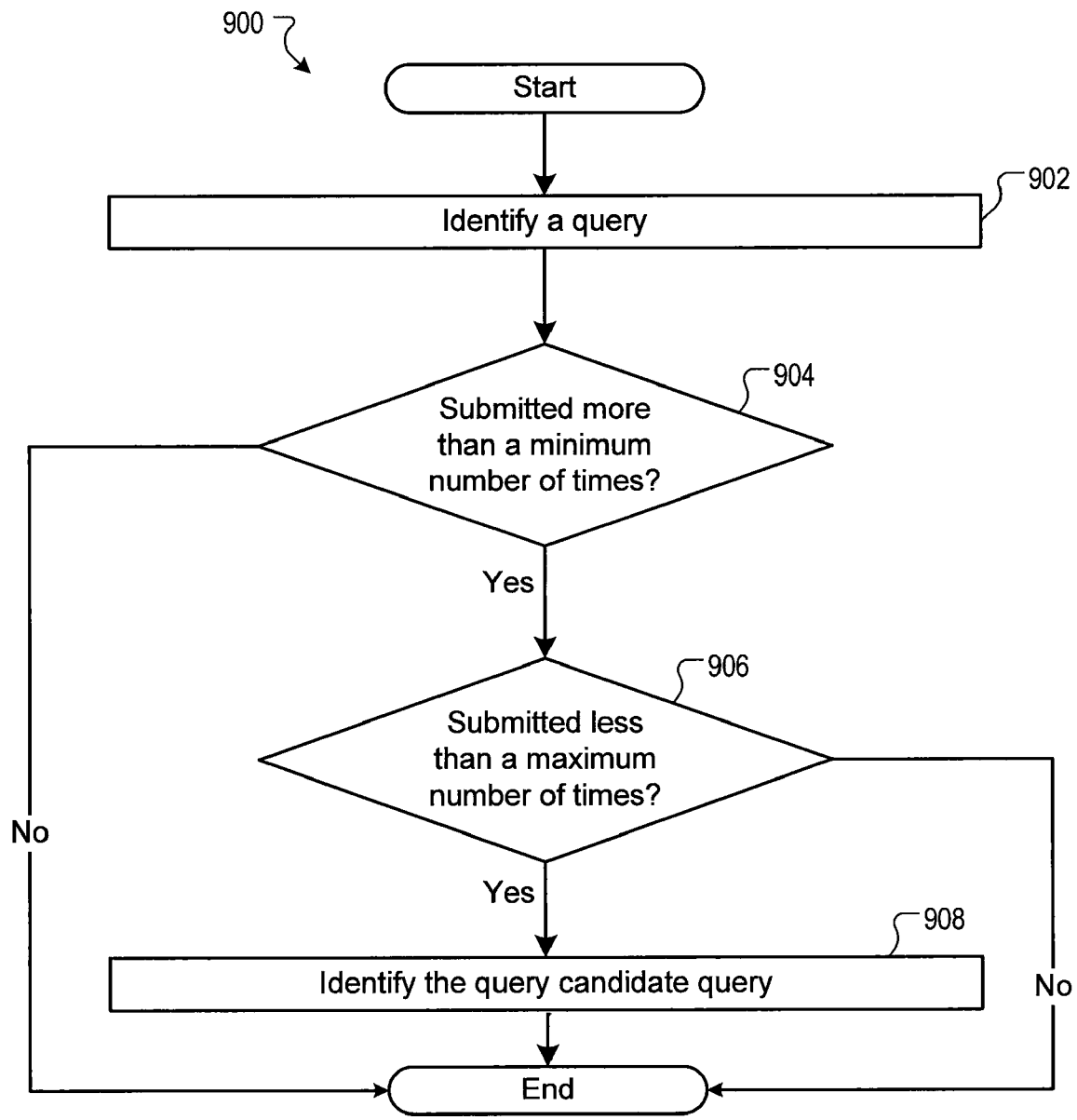
FIG. 9 is a flow diagram of an example process for query extraction.

FIG. 9 is a flow diagram of process 900 for query extraction. The process 900 can, for example, be implemented by the query-page identifier 114 of FIG. 1, and/or the query extractor 302 of FIG. 3. The process 900 can, for example, be used to implement stage 802 of FIG. 8.

Stage 902 identifies a query. For example, the query-page identifier 114, or the query extractor 302 can identify a query from the query log 128.

Stage 904 determines whether the query was submitted more than a minimum number of times. For example, the query-page identifier 114, or the query extractor 302 can determine from an analysis of the query logs 128 if the query was submitted more than a minimum number of times over a period, e.g., more than 50 times over one month.

If the query was determined to have been submitted more than a minimum number of times, stage 906 determines whether the query was submitted less than a maximum number of times. For example, the query-page identifier 114, or the query extractor 302 can determine from an analysis of the query logs 128 if the query was submitted more than a maximum number of times over a period, e.g., more than 50,000 times over one month.

If the query was determined to have been submitted less than a maximum number of times, stage 908 identifies the query as a candidate query. For example, the query-page identifier 114, or the query extractor 302 can identify the selected query as a candidate query and store the candidate query in a candidate query store 306.

Other algorithmic extraction processes can also be used to identify candidate queries. These other algorithmic extraction processes can be used in addition to or instead of the minimum submission threshold and maximum submission threshold of FIG. 9.

The proper subset criteria 406 can be used to identify a proper subset of the web index 120 to generate a first set of search results, and the entire web index 120 can be searched to identify a second set of search results.

Figure 10:
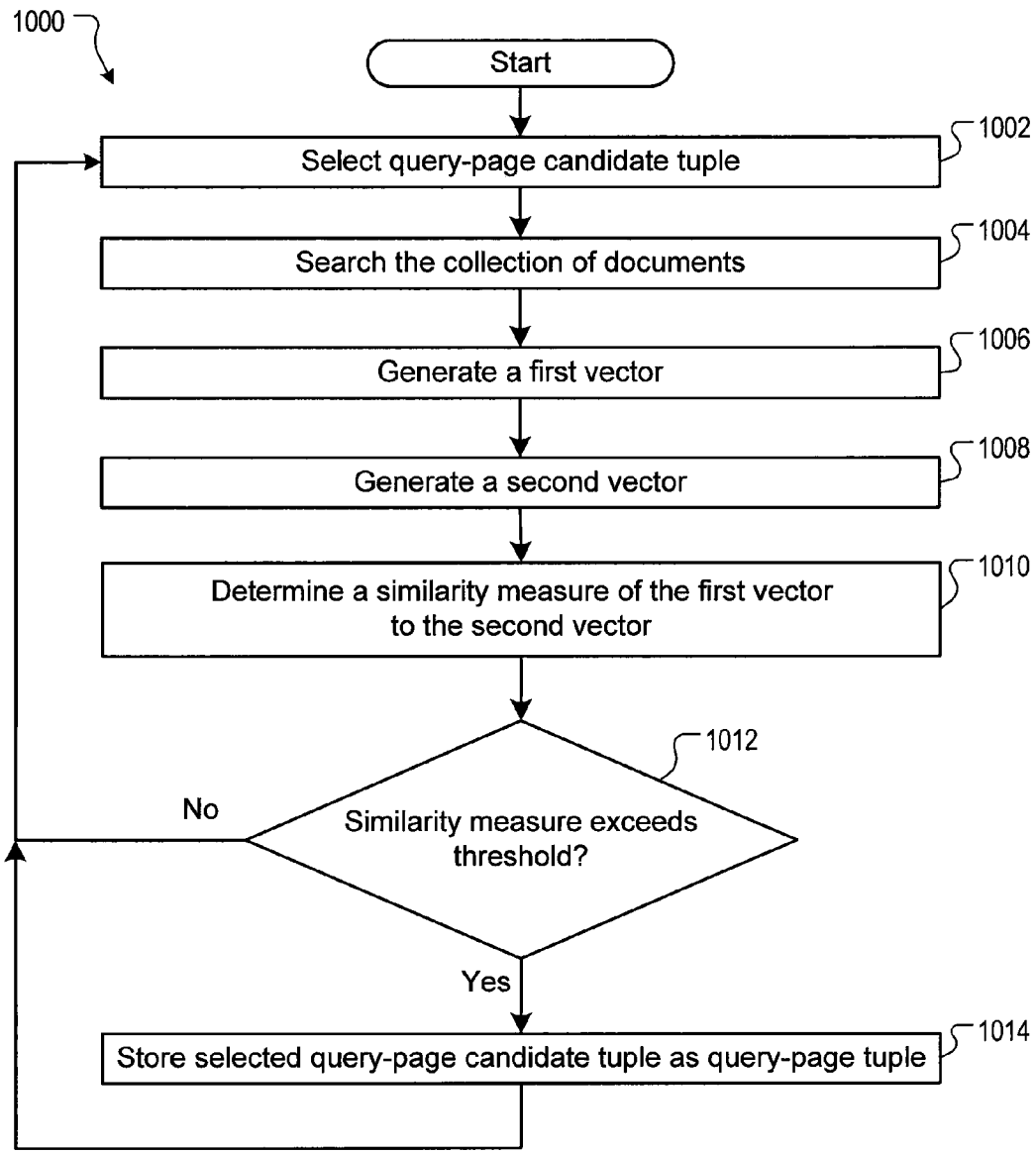
FIG. 10 is a flow diagram of an example process for filtering query-page candidate tuples.

FIG. 10 is a flow diagram of an example process 1000 for filtering query-page candidate tuples. The process 1000 can, for example, be implemented by the query-page identifier 114 of FIG. 1 and/or the candidate query search evaluator 408 of FIG. 4 and the filter 502 of FIG. 5. The process 1000 can be used to filter the query-page candidate tuples generated by the process 800.

Stage 1002 selects a candidate query-page tuple. For example, the query-page identifier 114 of FIG. 1 and/or the candidate query search evaluator 408 can select a candidate query-page tuple from the query-page candidate tuples 410.

Stage 1004 searches the collection of documents. For example, the query-page identifier 114 or the candidate query search evaluator 408 can cause the search engine to search the entire web index 120 with the candidate query of the selected query-page candidate tuple.

Stage 1006 generates a first vector. For example, the query-page identifier 114 or the filter 502 can generate a suggestion vector for a web document identified in the query-page candidate tuple.

Stage 1008 generates a second vector. For example, the query-page identifier 114 or the filter 502 can generate an intent vector for the web documents identified in response to the search of the entire web index 120 conducted in stage 1004.

Stage 1010 determines a similarity measure of the first vector to the second vector. For example, the query-page identifier 114 or the filter 502 can determine the similarity measure between the suggestion vector and the intent vector.

Stage 1012 determines if the similarity measure of the first vector to the second vector exceeds a threshold. For example, the query-page identifier 114 or the filter 502 determines if the similarity measure of the first vector to the second vector exceeds a threshold.

If stage 1012 determines that the similarity measure of the first vector to the second vector exceeds the threshold, then stage 1014 stores the query-page candidate tuple as a query page tuple. For example, the query-page identifier 114 or the filter 502 can store the selected query-page candidate tuple 410 as a query page tuple 504.

If stage 1012 determines that the similarity measure of the first vector to the second vector exceeds the threshold, the process 1000 returns to stage 1002. The process 1000 then repeats until no more query-page candidate tuples 410 remain to be processed.

Figure 11:
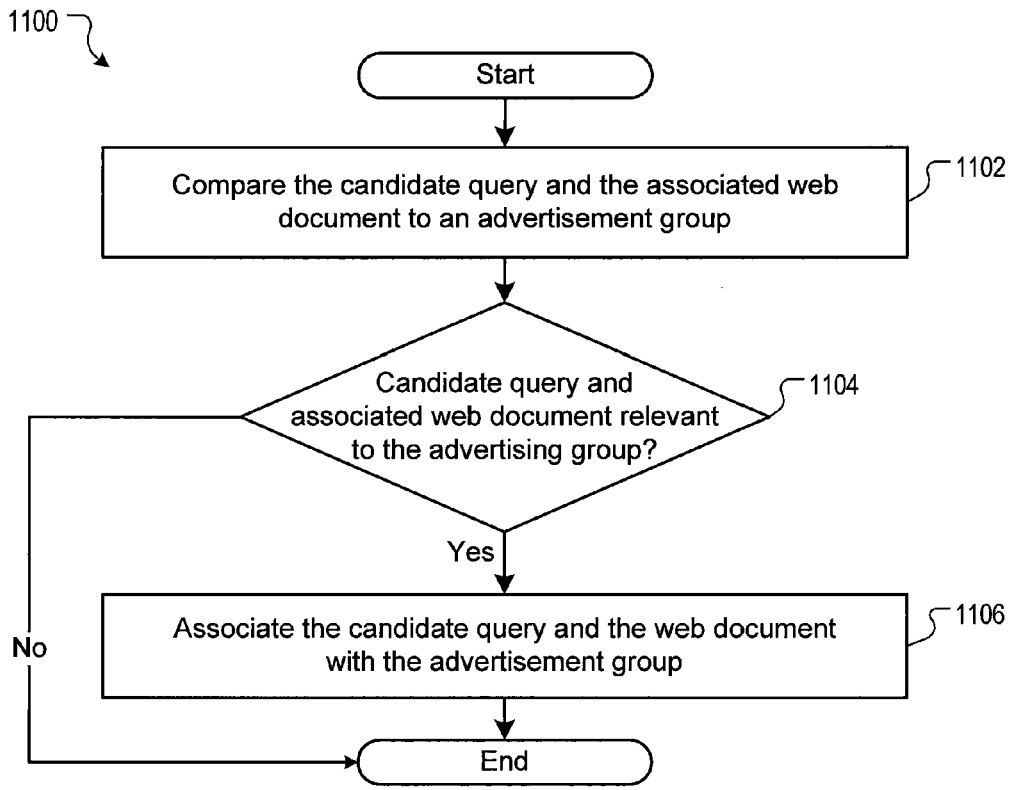
FIG. 11 is a flow diagram of an example process for associating a query-page tuple with an advertisement group.

FIG. 11 is a flow diagram of an example process 1100 for associating a query-page tuple with an advertisement group. The process 1100 can, for example, be implemented by the query-page identifier 114 or the ad group classifier 602 of FIG. 6.

Stage 1102 compares the candidate query and the associated web document to an advertisement group. For example, the query-page identifier 114 or the ad group classifier 602 can compare the keywords from the query-page tuples to keywords associated with advertisements in ad groups 212. The keywords of the query-page tuples can include keywords of the candidate queries, keywords of the associated web document, etc. The keywords of the advertisement group include keywords from search terms that the advertisement is associated with, keywords from the title of the advertisements and from landing pages associated with the advertisements, etc.

Stage 1104 determines whether the candidate query and the associated web document are relevant to the advertisement group. For example, based on the comparison of stage 1102, the ad group classifier 602 can determine whether the query-page tuple is relevant to the advertisement group 212. For example, when the keywords associated with an advertisement group include one or more of the keywords of the candidate query, the ad group classifier 602 determines that the candidate query and the associated web document are relevant to the advertisement group.

If the candidate query is determine to be relevant to the advertisement group, stage 1106 associates the candidate query and the web document with the advertisement group. For example, if the query-page identifier 114 or the ad group classifier 602 determines that the query-page tuple is relevant to the advertisement group, the candidate query can be associated with the advertisement group. The ad group classifier 602 can associate the candidate query with an existing advertisement, or it can generate a new advertisement based on the existing advertisements.

Figure 12:
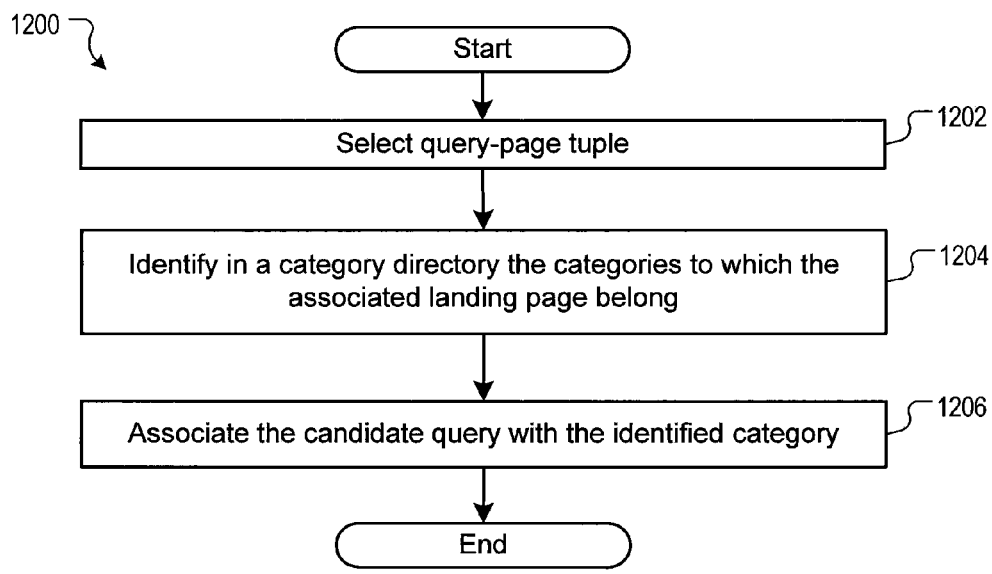
FIG. 12 is a flow diagram of an example process for associating a query with a category.

FIG. 12 is a flow diagram of an example process 1200 for associating a query with a category. The process 1200 can, for example, be implemented by the query-page identifier 114 of FIG. 1 and/or the query categorizer 702 of FIG. 7.

Stage 1202 identifies a query-page tuple. For example, the query-page identifier 114 and/or the query categorizer 702 can identify a query-page tuple from the query page tuples 504.

Stage 1204 identifies in a category directory the categories to which the associated landing page belongs. For example, the query-page identifier 114 and/or the query categorizer 702 can identify a category in a web director to which the associated landing page of the selected query-page tuple belongs.

Stage 1204 associates the candidate query with the identified category. For example, the query-page identifier 114 and/or the query categorizer 702 can associate the candidate query of the selected query-page tuple with the category identified in stage 1204.

Although particular types of web properties have been described above in various examples, the subject matter of this specification is not limited to these particular examples. The subject matter of this specification can be extended to any type of selectable content that can be classified into a proper subset of a larger set of content and for which the proper subset can be searched using queries that were used to search the larger set of content. Examples of such content include music content, audio content, video content, print content, radio content, articles, blogs, etc.

§5.0 Example Computer System

Figure 13:
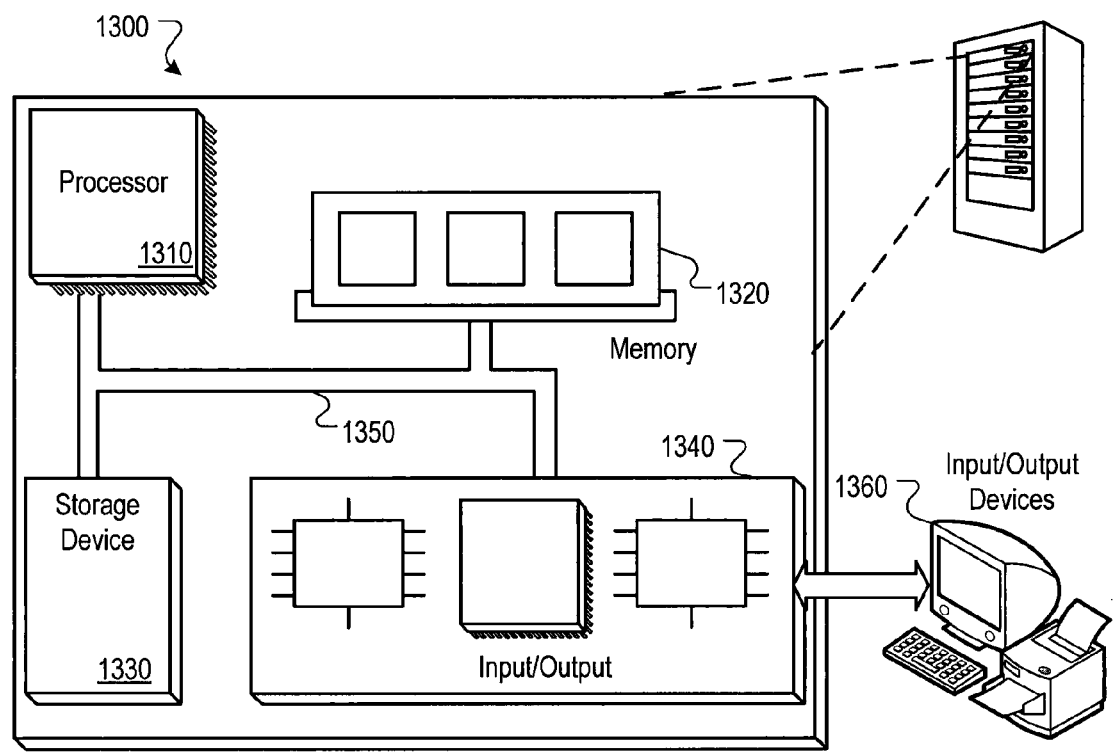
FIG. 13 is an example computer system.

FIG. 13 is block diagram of an example computer system 1300. The system 1300 can be used to implement the query page identifier 114 and/or the query extractor 302, candidate query search evaluator 408, filter 502, ad group classifier 602, and query categorizer 702 of FIGS. 1-7. Other computer systems, however, can also be used. The system 1300 and includes a processor 1310, a memory 1320, a storage device 1330, and an input/output device 1340. Each of the components 1310, 1320, 1330, and 1340 can, for example, be interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 can, for example, include a hard disk device, an optical disk device, or some other large capacity storage device.

The input/output device 1340 provides input/output operations for the system 1300. In one implementation, the input/output device 1340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1360.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, a composition of matter effecting a machine readable propagated signal, or a combination of one or more of them.

The processing devices disclosed herein encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying a candidate query from queries stored in a query log, wherein identifying the candidate query comprises:
identifying a query from the queries stored in a query log;
determining whether the query was submitted at least a minimum number of times during a time period;
determining whether the query was submitted less than a maximum number of times during the time period; and
identifying, by one or more computer processors, the query as the candidate query if the query was submitted at least the minimum number of times and less than the maximum number of times during the time period;
generating relevancy scores for a plurality of web documents, each relevancy score associated with a corresponding web document and being a measure of the relevance of the candidate query to the web document;
selecting a web document having an associated relevancy score that exceeds a relevancy threshold; and
associating the selected web document with the candidate query.

2. The method of claim 1, further comprising:
comparing the candidate query and the associated web document to an advertisement group, the advertisement group being an association of keywords and an advertisement;
determining if the candidate query and the associated web document are relevant to the advertisement group based on the comparison; and
if the candidate query and the associated web document are relevant to the advertisement group, then associating the candidate query and the web document with the advertisement group.

3. The method of claim 2, wherein associating the candidate query and the web document with the advertisement group comprises:
associating the candidate query with the advertisement; and
associating the web document with the advertisement, the association being operative to cause the advertisement to include a link to the web document when the advertisement is provided in response to a query that matches the candidate query.

4. The method of claim 1, wherein generating relevancy scores for a plurality of web documents comprises searching only a proper subset of a collection of web documents with the candidate query, the proper subset of the collection of web documents being the plurality of web documents.

5. The method of claim 4, wherein associating the selected web document with the candidate query comprises:
searching the collection of documents with the candidate query;
generating a first vector of terms from the results of the search of only the proper subset of a collection of web documents;
generating a second vector of terms from the results of the search of the collection of documents;
determining a similarity measure of the first vector of terms to the second vector or terms; and
associating the selected web document with the candidate query if the similarity measure exceeds a similarity threshold.

6. The method of claim 4, wherein associating the selected web document with the candidate query comprises:
searching the collection of documents with the candidate query;
generating a first vector of terms from the results of the search of the collection of documents;
determining an intent measure from the first vector of terms; and
associating the selected web document with the candidate query if the intent measure exceeds an intent threshold.

7. The method of claim 1, wherein identifying a candidate query comprises identifying a query that is directed to a commercial offering.

8. The method of claim 1, further comprising:
identifying in a category directory a category to which the selected web document belongs; and
associating the candidate query with the identified category so that the candidate query can be presented in response to a selection of the identified category.

9. The method of claim 1, wherein the web document is a landing page.

10. A computer-implemented method, comprising:
identifying candidate queries from queries stored in a query log, wherein identifying the candidate queries comprises:
identifying a query from the queries stored in a query log;
determining whether the query was submitted at least a minimum number of times during a time period;
determining whether the query was submitted less than a maximum number of times during the time period; and
identifying, by one or more computer processors, the query as a candidate query if the query was submitted at least the minimum number of times and less than the maximum number of times during the time period;
for each candidate query:
receiving a relevancy scores for a collection of landing pages, the collection of landing pages being a proper subset of a plurality of landing pages, and each relevancy score being associated with a landing page and being a measure of the relevance of the candidate query to the landing page;
identifying the landing pages having an associated relevancy score that exceeds a relevancy threshold; and
associating the candidate query with identified landing pages.

11. The method of claim 10, further comprising, for each candidate query:
comparing the candidate query and the associated landing pages to an association of keywords and an advertisement;
determining if the candidate query or the at least one of the associated landing pages are relevant to the association of keywords and an advertisement based on the comparison; and
associating the candidate query and the associated landing page with the advertisement in response to a positive determination.

12. The method of claim 10, wherein associating the candidate query with identified landing pages comprises, for each candidate query:

generating a first vector of terms from search results of a search of only a proper subset of the collection of landing pages;
generating a second vector of terms from search results of a search of the collection of landing pages;
determining a similarity measure of the first vector of terms to the second vector or terms; and
associating the candidate query with the landing page if the similarity measure exceeds a similarity threshold.

13. The method of claim 10, wherein associating the candidate query with identified landing pages comprises, for each candidate query:
generating a first vector of terms from search results of a search of the collection of landing pages;
determining an intent measure from the first vector of terms; and
associating the candidate query with the landing page if the intent measure exceeds an intent threshold.

14. A system, comprising:
one or more computer processors implementing:
a query extractor that identifies candidate queries from queries stored in a query log, wherein the query extractor:
identifies a query from the queries stored in a query log;
determines whether the query was submitted at least a minimum number of times during a time period;
determines whether the query was submitted less than a maximum number of times during the time period; and
identifies the query as the candidate query if the query was submitted at least the minimum number of times and less than the maximum number of times during the time period; and
a candidate query search evaluator that, for each candidate query, receives relevancy scores for a collection of landing pages, the collection of landing pages being a proper subset of a plurality of landing pages, and each relevancy score being associated with a landing page and being a measure of the relevance of the candidate query to the landing page, and compares the relevancy scores to a relevancy threshold and associates the landing pages having relevancy scores exceeding the relevancy threshold with the candidate query.

15. The system of claim 14, wherein the one or more computer processors further implement:
a filter that receives the candidate queries and associated landing pages and, for each candidate query and associated landing pages, filters associations of landing pages to the query based on a relevancy criterion.

16. The system of claim 14, wherein the one or more computer processors further implement:
a query categorizer that, for each candidate query, identifies in a category directory the categories to which the associated landing pages belong, and associates the candidate query with the identified category so that the candidate query can be presented in response to a selection one of the identified categories.

17. The system of claim 14, wherein the one or more computer processors further implement:
an advertisement group analyzer that, for each candidate query:
compares the candidate query and the associated landing pages to an advertisement group, the advertisement group being an association of keywords and an advertisement;
determines if the candidate query and the associated landing pages are relevant to the advertisement group based on the comparison; and
associates the candidate query and the landing page with the advertisement group if the candidate query and the associated web document are determined to be relevant to the advertisement group.

* * * * *

UNITED STATES PATENT AND TRADEMARK OFFICE
CERTIFICATE OF CORRECTION

PATENT NO. : 8,171,021 B2
APPLICATION NO. : 12/486195
DATED : May 1, 2012
INVENTOR(S) : Ramanathan V. Guha et al.

Page 1 of 1

It is certified that error appears in the above-identified patent and that said Letters Patent is hereby corrected as shown below:

First Page, Line 7, Column 1 (Inventors), delete "Pradesh" and insert -- Uttar Pradesh; --, therefor.

Signed and Sealed this
Seventeenth Day of July, 2012

David J. Kappos
*Director of the United States Patent and Trademark Office*